(12) United States Patent
Kemp et al.

(10) Patent No.: US 7,495,999 B2
(45) Date of Patent: Feb. 24, 2009

(54) UNDERWATER GUIDANCE SYSTEMS, UNMANNED UNDERWATER VEHICLES AND METHODS

(75) Inventors: Mathieu P. Kemp, Durham, NC (US); Frederick Vosburgh, Durham, NC (US); Jeffrey Krolik, Chapel Hill, NC (US)

(73) Assignee: Nekton Research LLC, Durham, NC (US)

( * ) Notice: Subject to any disclaimer, the term of this patent is extended or adjusted under 35 U.S.C. 154(b) by 69 days.

(21) Appl. No.: 11/495,134

(22) Filed: Jul. 28, 2006

(65) Prior Publication Data

US 2008/0239874 A1  Oct. 2, 2008

Related U.S. Application Data

(60) Provisional application No. 60/705,077, filed on Aug. 3, 2005.

(51) Int. Cl.
*F41G 7/22* (2006.01)
(52) U.S. Cl. ...................................... 367/131
(58) Field of Classification Search ................ 367/131, 367/96, 120; 114/312; 701/21
See application file for complete search history.

(56) References Cited

U.S. PATENT DOCUMENTS

| | | | | |
|---|---|---|---|---|
| 2,405,281 A | * | 8/1946 | Bemis | ......................... 367/120 |
| 2,533,299 A | * | 12/1950 | Walsh | ......................... 367/118 |
| 2,961,190 A | * | 11/1960 | Miller et al. | ................... 367/96 |
| 4,103,279 A | | 7/1978 | Dildy, Jr. et al. | |
| 4,176,338 A | | 11/1979 | Spindel et al. | |
| 4,425,634 A | * | 1/1984 | Iino et al. | .................... 367/120 |
| 5,077,700 A | | 12/1991 | Shaw et al. | |
| 6,272,072 B1 | | 8/2001 | Wulich et al. | |
| 7,006,407 B2 | | 2/2006 | Davies et al. | |

* cited by examiner

*Primary Examiner*—Dan Pihulic
(74) *Attorney, Agent, or Firm*—Myers Bigel Sibley & Sajovec, P.A.

(57) ABSTRACT

An unmanned underwater vehicle for use in water and with at least one acoustic signal source includes a vehicle body, a steering mechanism to direct the vehicle body through the water, a propulsion device to force the vehicle body through the water, and an adaptive Doppler guidance and control (ADGC) system. The ADGC system is configured to receive acoustic signals from the at least one acoustic signal source and to control the steering mechanism using changes in at least one frequency component of the received acoustic signals caused by Doppler shifts.

24 Claims, 5 Drawing Sheets

UNDERWATER GUIDANCE SYSTEMS, UNMANNED UNDERWATER VEHICLES AND METHODS

RELATED APPLICATION(S)

This application claims the benefit of and priority from U.S. Provisional patent application Ser. No. 60/705,077, filed Aug. 3, 2005, the disclosure of which is incorporated herein by reference in its entirety.

STATEMENT OF GOVERNMENT SUPPORT

This invention was made with support under Small Business Innovation Research (SBIR) Program No. N66604-05-C-0287 awarded by the United States Navy. The Government has certain rights in the invention.

FIELD OF THE INVENTION

The present invention relates to guidance systems and, more particularly, underwater guidance systems and methods.

BACKGROUND OF THE INVENTION

Sea mines present an asymmetric threat that, in addition to causing injury or damage if detonated, can effectively exclude ships and personnel from large areas during or after periods of conflict. Mines clearance typically is by detonation using devices placed on the mines by divers or sea mammals, exposing them to substantial risk. As a result, the U.S. Navy has issued a requirement for expendable autonomous undersea vehicles (AUV) that can be deployed in significant numbers without detection days or weeks in advance of anticipated conflict. Often, the AUV must navigate to a mine with an accuracy measured in inches after being launched from miles away. Navigating reliably to the mine in the noisy disturbed waters of littoral regions may require advances in capabilities in a device that is far less expensive than those used today for autonomous AUV navigation.

SUMMARY OF THE INVENTION

According to embodiments of the present invention, an unmanned underwater vehicle for use in water and with at least one acoustic signal source includes a vehicle body, a steering mechanism to direct the vehicle body through the water, a propulsion device to force the vehicle body through the water, and an adaptive Doppler guidance and control (ADGC) system. The ADGC system is configured to receive acoustic signals from the at least one acoustic signal source and to control the steering mechanism using changes in at least one frequency component of the received acoustic signals.

According to some embodiments, the ADGC system is configured to compensate for at least one of physical perturbations to the unmanned underwater vehicle and multi-path signals.

The ADGC system may include a guidance sensor to sense a parameter of the unmanned underwater vehicle. The guidance sensor may also receive communication signals, which may include modulations of the acoustic signal from the source.

According to some embodiments, the ADGC system includes a digital sampler and a digital processor. The digital sampler is configured to convert at least one of an acoustic sensor signal and a guidance sensor signal to a digital signal. The digital processor is configured to process the digital signal according to an algorithm to compute a guidance update and to communicate the guidance update to at least one of the steering mechanism and the propulsion device.

The unmanned underwater vehicle may include a payload.

According to embodiments of the present invention, an underwater guidance system for use in water and with at least one acoustic signal source includes an adaptive Doppler guidance and control (ADGC) system. The ADGC system is configured to receive acoustic signals from the at least one acoustic signal source and to generate navigation signals and/or mapping signals based on changes in at least one frequency component of the received acoustic signals caused by Doppler shifts.

According to some embodiments, the underwater guidance system further includes the at least one acoustic signal source. The at least one acoustic signal source may include a prescribed source device. The at least one acoustic signal source may include a source of opportunity.

According to some embodiments, the at least one acoustic signal source includes a plurality of spatially separated acoustic signal sources and the ADGC system is operative to interpolate therebetween.

According to some embodiments, the ADGC system is configured to send and/or receive acoustic communications signals.

According to embodiments of the present invention, a system for use in water includes at least one acoustic signal source and an unmanned underwater vehicle. The unmanned underwater vehicle includes a vehicle body, a steering mechanism to direct the vehicle body through the water, a propulsion device to force the vehicle body through the water, and an adaptive Doppler guidance and control (ADGC) system. The ADGC system is configured to receive acoustic signals from the at least one acoustic signal source and to control the steering mechanism using changes in at least one frequency component of the received acoustic signals caused by Doppler shifts.

According to method embodiments of the present invention, a method for navigating and/or mapping underwater includes: receiving acoustic signals from at least one acoustic signal source; processing the received acoustic signals; and generating navigation signals and/or mapping signals based on changes in at least one frequency component of the received acoustic signals caused by Doppler shifts.

The step of generating navigation signals and/or mapping signals may include generating navigation signals, the method further including controlling a direction of propulsion of an underwater vehicle using the navigation signals. The navigations signals may be adapted to maintain an intended direction of movement of the underwater vehicle that results in a desired Doppler shift of the at least one frequency component of the received acoustic signals. The method may include determining a location and/or an orientation of the underwater vehicle. The method may include sensing a parameter of the underwater vehicle. The method may include compensating for at least one of physical perturbations to the underwater vehicle and multi-path signals. The method may further include removing undesirable components from the received acoustic signals including components at undesired frequencies and components that are incoherent with respect to the at least one frequency component. According to some embodiments, the method includes removing secondarily arriving signal components that are substantially coherent with a first arriving signal component. According to some embodiments, the method includes determining, with respect to at least one of a steering mechanism of the underwater vehicle and a propulsion mechanism of the underwater vehicle, at least one of position, orientation, force, torque, and angular velocity.

According to some embodiments, the method includes demodulating the at least one frequency component of the received acoustic signals to determine frequency modulations and/or amplitude modulations of the at least one frequency component of the received signals.

According to some embodiments, the at least one frequency component of the received acoustic signals includes a plurality of frequency components, and processing the received acoustic signals includes determining the Doppler shift for the plurality of frequency components of the received acoustic signals.

According to some embodiments of the present invention, an unmanned underwater vehicle for use in water and with at least one acoustic signal source includes a vehicle body, a steering mechanism to direct the vehicle body through the water, a propulsion device to force the vehicle body through the water, and an adaptive guidance and control system configured to receive acoustic signals from the at least one acoustic signal source and to control the steering mechanism using changes in at least one frequency component of the received acoustic signals. The adaptive guidance and control system is configured to compensate for at least one of: physical perturbations to the unmanned underwater vehicle; and multi-path signals.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
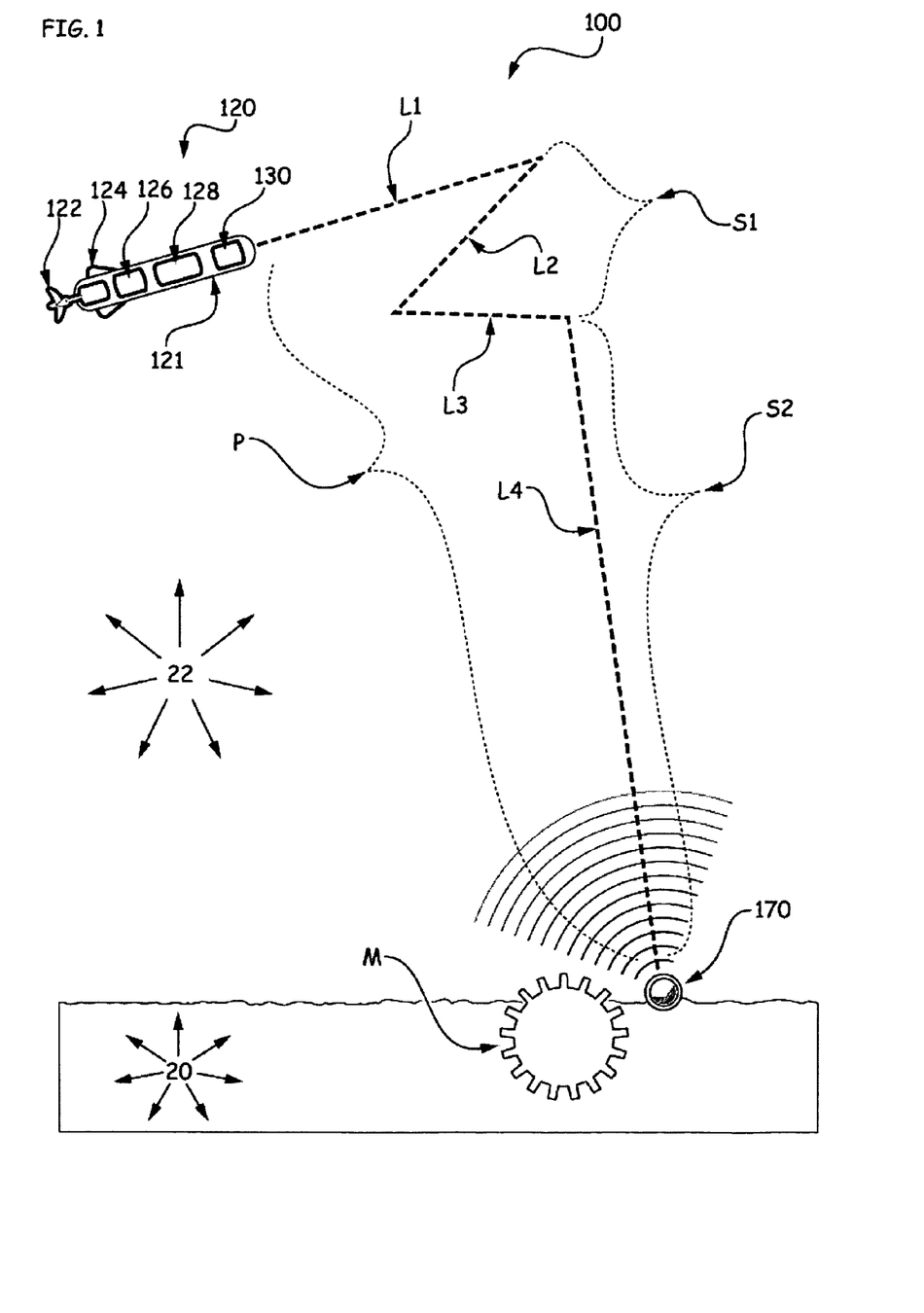
FIG. 1 is a schematic view of an underwater system and according to embodiments of the present invention and a mine in water.

With reference to FIG. 1, an underwater system 100 according to embodiments of the present invention is shown therein with an object M of interest such as a mine in water 22. The object M may be fully or partially buried in a substratum or sediment 20 below the water, for example. The object M may be floating or tethered as well. The underwater system 100 includes an acoustic source 170 and an underwater vehicle 120. Generally and as discussed in more detail below, the underwater system 100 is configured and constructed to enable the underwater vehicle 120 to navigate and/or map with respect to the acoustic source 170. The acoustic source 170 emits acoustic signals that are detectable by the vehicle 120. The vehicle 120 uses adaptive Doppler direction finding while in transit to navigate and/or map with respect to the acoustic source 170.

According to some embodiments, the vehicle 120 is an autonomous or unmanned underwater vehicle. In some embodiments and as illustrated, the vehicle 120 includes a vehicle body 121, a propulsor 122, a navigation or steering mechanism 124, a power supply 126, and an adaptive Doppler guidance and control system (referred to herein as an "ADGC system") 130.

The navigation or steering mechanism 124 may include a rudder, for example. The steering mechanism 124 is operable to adjust the direction of travel of the vehicle 120 in transit.

The propulsor 122 may be any suitable mechanism for propelling the vehicle 120 through the water 22. Suitable propulsor mechanisms may include a propeller driven by an electric motor.

The vehicle 120 may carry a payload 128. According to some embodiments, the payload 128 includes a mine neutralizing device. According to some embodiments, the payload 128 includes a sensor device, a communications device, and/or a logistical device.

The ADGC system 130 is configured and adapted to determine a direction (referred to herein as a "Doppler Direction") to the acoustic source 170 based on the detected signals emitted (continuously or intermittently) from the acoustic source 170 and based on a plurality of Doppler shift measures, as discussed herein. The ADGC system 130 can provide navigation output based on the received acoustic signals. In some cases, the navigation output includes an actuating signal provided to an actuator aspect of the steering mechanism 124.

With reference to FIG. 1, an exemplary navigation procedure for the system is illustrated therein. The vehicle 120 is shown located at a starting point spaced apart from the source 170. The vehicle 120 travels a path P through the water 22 under power of the propulsor 122, for example. The vehicle 120 begins by transiting in a first direction or heading along a first leg L1. The vehicle 120 then turns and travels in a second direction along a second leg L2. The vehicle 120 then turns and travels in a third direction along a third leg L2. The legs L1-L3 may be referred to as a tacking portion or section S1 of the path P. The vehicle 120 then turns again and travels in a fourth direction along a fourth leg L4, which is a direct path toward the source 170. The fourth direction may be referred to as the Doppler direction and the fourth leg L4 may form the Doppler direction portion or section S2 of the path P.

While the vehicle 120 is traveling along each of the first and second legs L1, L2, the ADGC system 130 receives and processes acoustic signals that are contemporaneously emitted from the source 170. The acoustic signals as received by the ADGC system 130 will each be modified by Doppler shift as compared to the emitted acoustic signals. The magnitude of the Doppler shift will differ depending on velocity and, therefore, the direction the vehicle is traveling relative to the source 170. As the vehicle 120 moves away from the source 170, the frequency of the received signal is reduced by the Doppler shift. As the vehicle 120 moves toward the source 170, the frequency of the received signal is increased by the Doppler shift. The ADGC system 130 can monitor the received acoustic signals for changes in frequency and determine therefrom whether a given change in direction of the vehicle 120 places the vehicle 120 on a more direct path toward the source 170 or a less direct path. For example, the ADGC system 130 may use one or more deliberate or incidental tacking sections S1 to determine the Doppler direction and thereafter navigate or map based on the determined Doppler direction.

Accordingly, the track or path P may include at least one portion having a direction other than the Doppler direction. The path P may include at least one tacking portion. The path P may include multiple non-Doppler direction segments and/or multiple Doppler direction segments. In particular, the path P may include multiple non-Doppler direction segments interspersed with multiple Doppler direction segments.

More particularly, the ADGC system 130 generates navigation signals and/or mapping signals based on changes in at least one frequency component of the received acoustic signals caused by Doppler shifts. According to some embodiments, the ADGC system 130 generates navigation signals, which are used to control a direction of propulsion of the underwater vehicle 120 using the navigation signals. For example, the navigation signals can be received by an actuator that selectively controls the steering mechanism 124. These navigation signals may be adapted to maintain an intended direction of movement of the underwater vehicle 120 that results in a desired Doppler shift of the at least one frequency component of the received acoustic signals. For example, the navigation signals may be configured to cause the vehicle 120 to move in the Doppler direction (i.e., the direct path to the source 170), if known, and, if the Doppler direction is not known, in a direction that reduces the Doppler shift value of the at least one frequency component.

Certain additional determinations may be made by the ADGC system 130 to facilitate navigation of the vehicle 120. The ADGC system 130 may determine a location and/or an orientation of the underwater vehicle 120. The ADGC system 130 may determine, with respect to at least one of the steering mechanism 124 and the propulsion mechanism 122, at least one of position, orientation, force, torque, and angular velocity. As part of the processing of the received acoustic signals by the ADGC system 130, the ADGC system 130 may demodulate the at least one frequency component of the received acoustic signal to determine frequency modulations and/or amplitude modulations of the at least one frequency component of the received signal relative to a carrier signal of the received acoustic signal. According to some embodiments, the received acoustic signal includes a plurality of frequency components, and the ADGC system 130 determines the Doppler shift for the plurality of frequency components of the received acoustic signal. In some embodiments, the demodulation includes information desirably transmitted to the vehicle 120.

While the system 100 has been described as including and with reference to a stationary acoustic source 170, in accordance with some embodiments of the present invention the source 170 is carried by a moveable object such as a boat or swimmer.

While the system 100 has been described as including and with reference to an unmanned vehicle 130, in accordance with some embodiments of the present invention the ADGC system 130 can be deployed at a desirable detection location to provide Doppler shift detection of passing objects.

As noted herein, the ADGC system 130 may generate mapping signals in addition to or in place of navigation signals. Mapping signals include signals locating the vehicle 120 or desirably mapped or located objects with respect to the substratum. If the location of the vehicle 120 is known, the ADGC system 130 and/or an associated system can record a signal or signals (internal or external to the vehicle 120) as a map or mapped data. For example, the ADGC system 130 can create a map of the track followed by the vehicle 120. For example, the vehicle 120 can locate itself by determining the intersection of the Doppler directions to a plurality of sources 170. By this method, the vehicle 120 can record signals from its sensors as a function of the vehicle location at the time of receiving the signal. It can be seen that by this method the vehicle can follow an arbitrary track with respect to the plurality of sources 170 and create a map signal characterizing the environment of the vehicle (e.g., with regard to bathymetry, object location, acoustic source location, water movement, and/or water parameter profile). The mapping signals so created can then be used to relocate an object or location of interest at another time by another vehicle 120.

In some embodiments, the ADGC system 130 compensates for at least one environmental effect adversely affecting Doppler direction finding or navigation. Such environmental effects may include physical perturbations to the vehicle, incoherent acoustic noise, multi-path signal propagation (i.e., multi-path signals), trajectory disturbance, temperature, background noise and/or directional noise. The ADGC system 130 may remove undesirable components from the received acoustic signals such as signal components at undesired frequencies and components that are incoherent with respect to the frequency or frequencies that are being monitored for Doppler shifts.

Figure 3:
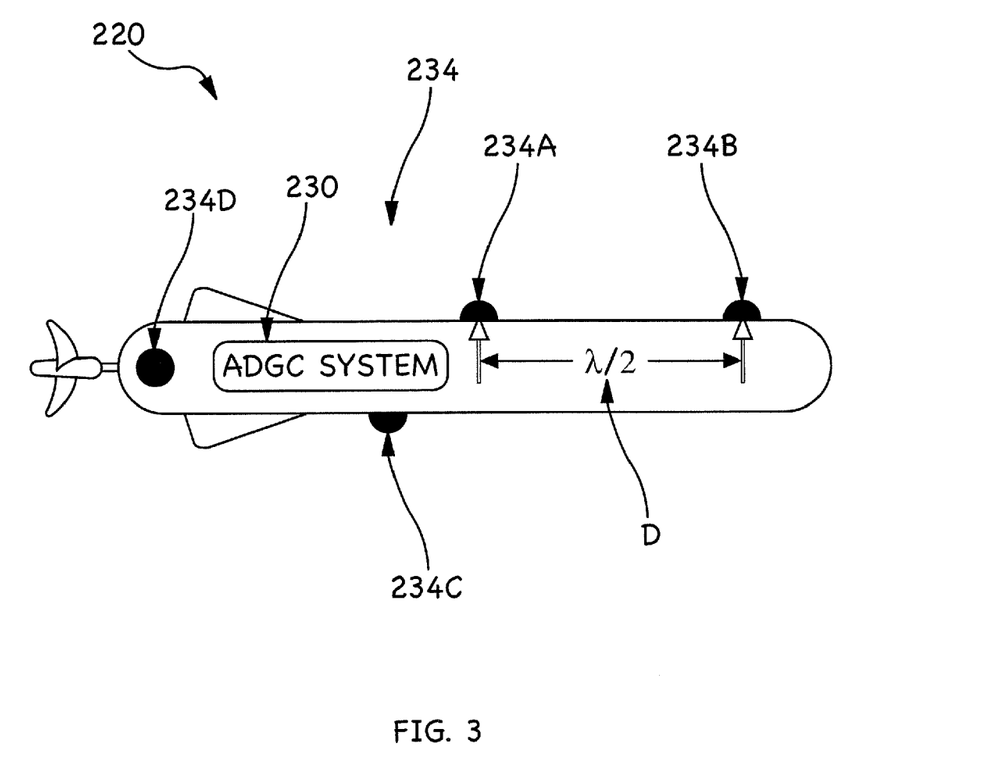
FIG. 3 is a side schematic view of an unmanned underwater vehicle according to further embodiments of the present invention.

A multi-path signal is a signal propagating by more than one path such as both direct and reflected paths (e.g., signals reflected off the surface of the water, the seafloor and/or other objects). The multi-path compensation may include adjusting for or removing multi-path effects to provide a signal or a Doppler shift measure with reduced multi-path effects. One example multi-path compensator is a filter that can isolate a first arriving component of the received or detected signal. In some cases, the compensator further comprises a spread spectrum system (e.g., including an algorithm conducted by a processor of the ADGC system 130) that uses a plurality of tonals in defined frequency and temporal relationship to detect the first arriving component of the detected signal. In some cases, the filter is applied to the detected signal after conversion to digital form. In some cases, digital filtering includes spread spectrum processing, for example, analogous to cellular communications or GPS localization, which in some instances isolate first arriving components, and thereafter determine Doppler shift. In some cases, a digital signal is first subjected to a zero fill procedure to provide enhanced frequency resolution. According to some embodiments, a pulsed signal is detected and the first arriving component of the signal is isolated as a signal traveling a direct path, (e.g., without reflection), to provide a signal for demodulation that does not have multi-path effects. According to some embodiments, the detected signal is detected with a plurality of sensors and the signals (i.e., the replicas of the first signal delayed in time) are combined by a coherent method that removes multi-path artifacts. In some cases, the time of first arrival of a multipath signal can be determined for one or more sensors (e.g., the sensors 234A-D as shown in FIG. 3) and combined coherently according to time of arrival. The Doppler shift measures may allow precise determination of time of arrival of signals and, with two such measures, the bearing to a source can be measured.

Trajectory disturbance can include a motion of the ADCG system 130 owing to hydrodynamic effect such as surge, turbulence, waves or current. Trajectory disturbance can also include disturbance by physical contact with an obstacle. Trajectory disturbance is compensated for by removing signal components due to such extrinsically caused vehicle movement. According to some embodiments, trajectory disturbance is compensated for by applying a Weiner filter to the detected signal using a disturbance sensor output as an artifact reflective input. The disturbance sensor may include at least one of: a vibration sensor, an acceleration sensor, a rotation rate sensor, a velocity sensor, a rotation sensor, a displacement sensor, a depth sensor, and an attitude sensor. The disturbance sensor may include an inertial navigation unit, a compass and/or an accelerometer. According to some embodiments, trajectory disturbance is compensated for by removing current effects using velocity field data stored in memory, whereby a current related Doppler shift can be subtracted from a measured Doppler shift. In some cases, at least one filter cut off frequency is adjusted according to tonal frequency shift caused by water currents. According to some embodiments, trajectory disturbance is compensated for by subtracting Doppler shift measurements reflective of a plurality of headings (or succeeding times on a heading or leg) to determine a Doppler shift measure independent of current effects. According to some embodiments, trajectory disturbance is compensated for by removing Doppler shift sidebands due to surge by band pass filtering the demodulated signal in the analog or digital domain. According to some embodiments, trajectory disturbance is compensated for by digital sideband removing where sidebands from a plurality of tonal harmonics are combined to isolate the central component of the Doppler shift. In some embodiments, the sideband removing is conducted using a tracking filter which compensates for DC offset of Doppler shift due to current effects.

Temperature effects include a change in emitter or sensor operation, such as frequency drift due to change in temperature. According to some embodiments, temperature compensation includes controlling or adjusting oscillator function to maintain a substantially fixed frequency for emitting by a source or for demodulating by the ADGC system 130. A voltage-controlled oscillator may be used together with a temperature sensor providing a voltage output to control oscillator frequency at a more or less fixed value over the temperature range during use.

Background noise may include acoustic energy at any frequency that can reduce detectability of a tonal. According to some embodiments, background noise is compensated for by removing signal components at frequencies other than the tonal frequency. Background noise may be removed by band pass filtering a detected signal in the analog or digital domain with the filter encompassing the tonal frequency. In some embodiments, the pass bandwidth or center of the band pass filter is adjustable.

Directional noise can be a signal from any direction, for example, noise from a passing ship which can mask a desirably detected tonal. In some cases, directional noise may be noise that emanates from any direction other than that of the acoustic signal source. Compensation for directional noise can be provided by spatial filtering, such as conventional beam forming or other means of coherent combining. In some cases, spatial filtering is conducted using an analog circuit that combines a plurality of detected signals in a manner that constructively combines signal elements reflective of a desirable direction and destructively combines signals from other directions.

Figure 2:
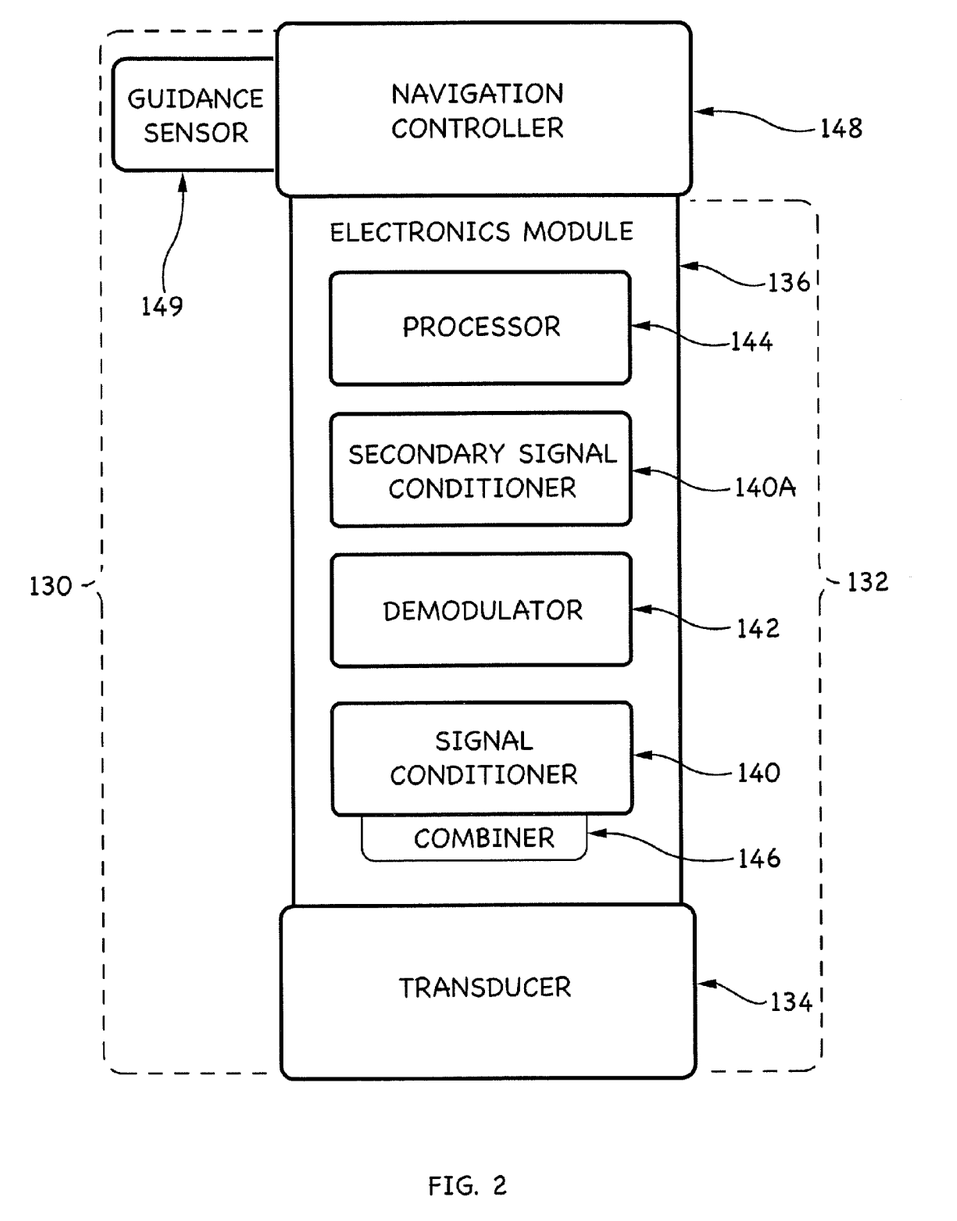
FIG. 2 is a schematic view of an adaptive Doppler guidance and control (ADGC) system of the underwater guidance system of FIG. 1.

With reference to FIG. 2, the ADGC system 130 is schematically shown therein in more detail. The ADGC system 130 is exemplary of suitable ADGC systems in accordance with embodiments of the present invention and it will be appreciated from the description herein that other configurations and constructions may be employed in accordance with other embodiments. The ADGC system 130 includes a Doppler direction finder (DDF) 132 and a navigation controller 148. The DDF 132 may include a transducer 134 and an electronics module 136. In some cases, the electronics module 136 includes a signal conditioner 140, a demodulator 142 and a processor 144. The electronics module 136 may includes other types of sensors such as a compass or a GPS receiver. The processor 144 may be any suitable circuit that can combine, compare and/or process a plurality of Doppler shift measures and other signals to determine a Doppler direction and/or a compensated Doppler direction.

According to some embodiments, the transducer 134 is any suitable device that can detect a tonal.

The demodulator 142 can be any suitable type of analog or digital circuit that can demodulate a signal to provide a Doppler shift measure. In some cases, the demodulator 142 includes a reference oscillator that can provide a demodulating reference signal. In some cases, the oscillator is also temperature compensated, which can provide a substantially constant frequency demodulating reference signal at a plurality of temperatures.

The navigation controller 148 may be any suitable component(s) that can provide at least one output for control of heading. According to some embodiments, the navigation controller 148 includes a suitable circuit, actuator, device and/or other component(s) operative to selectively control the operation of the steering mechanism 124. According to some embodiments, the navigation controller 148 is operative to selectively control operation of the propulsor 122. In some cases, the processor 144 functions as a controller.

In some embodiments, the electronics module 144 includes a combiner 146 that can constructively or destructively combine signals from a plurality of sensing elements. In some cases, the combiner 146 is an analog circuit. In some cases, the combiner 146 adjusts phase among a plurality of signals to enhance coherence with respect to a desirable direction and reduce coherence with respect to an undesirable direction. In some embodiments, a secondary signal conditioner 140A is provided to receive and condition the output of the demodulator 142. In some cases, the secondary signal conditioner 140A is a band pass filtering type conditioner that provides a sideband removed Doppler shift measure representative of the unmodulated, or average, velocity of the vehicle from which variations in velocity represented by the sidebands are removed.

The processor 144 may include a converter, a signal processor, a memory, and/or a clock. The converter may be an analog to digital converter that can convert an analog signal for digital processing. In some embodiments, the converter is a digital to analog converter that can convert a digital signal to analog form for communicating or other output. In some embodiments, the analog/digital circuit further includes a signal amplifier that provides an amplified signal for emitting. The memory can be any suitable type of memory that can store digital information. The clock may include, for example, an oscillator, a digital clock, a PC counter, or GPS clock.

The ADGC system 130 may also include a guidance sensor 149. The guidance sensor 149 is operative to sense a parameter of the vehicle 120 such as vehicle position, heading, speed, velocity, rotation, rotation rate, torque, angle, acceleration, depth, altitude, and/or orientation. The guidance sensor 149 may also receive communication signals, which may include modulations of the acoustic source signal. The guidance sensor 149 may provide data corresponding to the sensed parameter(s) to the navigation controller 148 and/or the processor 144. The navigation controller 148 and/or processor 144 may incorporate this data into their determinations.

According to some embodiments, the ADGC system 130 includes a digital sampler (e.g., as a part of the electronics module 136) and a digital processor (e.g., the processor 144). The digital sampler is configured to convert acoustic signals from the transducer 134 and/or guidance sensor signals from the guidance sensor 149 to digital signals. The digital processor 144 is operative to process the digital signals according to an algorithm to compute a guidance update. The digital processor 144 is further operative to communicate (e.g., via the navigation controller) the guidance update to the steering mechanism 124 and/or the propulsor 122.

With reference to FIG. 3, an AUV or unmanned underwater vehicle 200 according to further embodiments of the present invention is shown therein. The vehicle 200 may be used in the system 100 in place of the vehicle 120 and may correspond to the vehicle except as follows. The vehicle 200 includes an ADGC system 230 corresponding to the ADGC system 130 (for example, as described with reference to FIG. 2) except that the transducer 134 is replaced or supplemented with a transducer system 234. The transducer system 234 includes a plurality of spaced apart transducers or sensing elements 234A-D. In an illustrative arrangement of the sensing elements 234A-D, two of the sensing elements (i.e., the sensing elements 234A, 234B) are mounted forward on the vehicle 220 and two of the sensing elements (i.e., the sensing elements 234C, 234D) are mounted aft on the vehicle 220. However, other quantities and arrangements of the sensing elements may be provided. In some cases, at least some of the sensing elements (e.g., the sensing elements 234A, 234B) are spaced apart a distance D that is approximately half the longest wavelength of a desirably detected signal component (lambda/2). However, other separation lengths may be used. In some cases, the sensing element signals can be combined (e.g., for beam forming) to provide spatial filtering or determine the range or bearing of a signal source. In some embodiments, the sensing elements include or form an array such as a linear, multi-line, sparse, random, and/or phased array, which array can be mounted at desirable locations on the vehicle 220.

Figure 4:
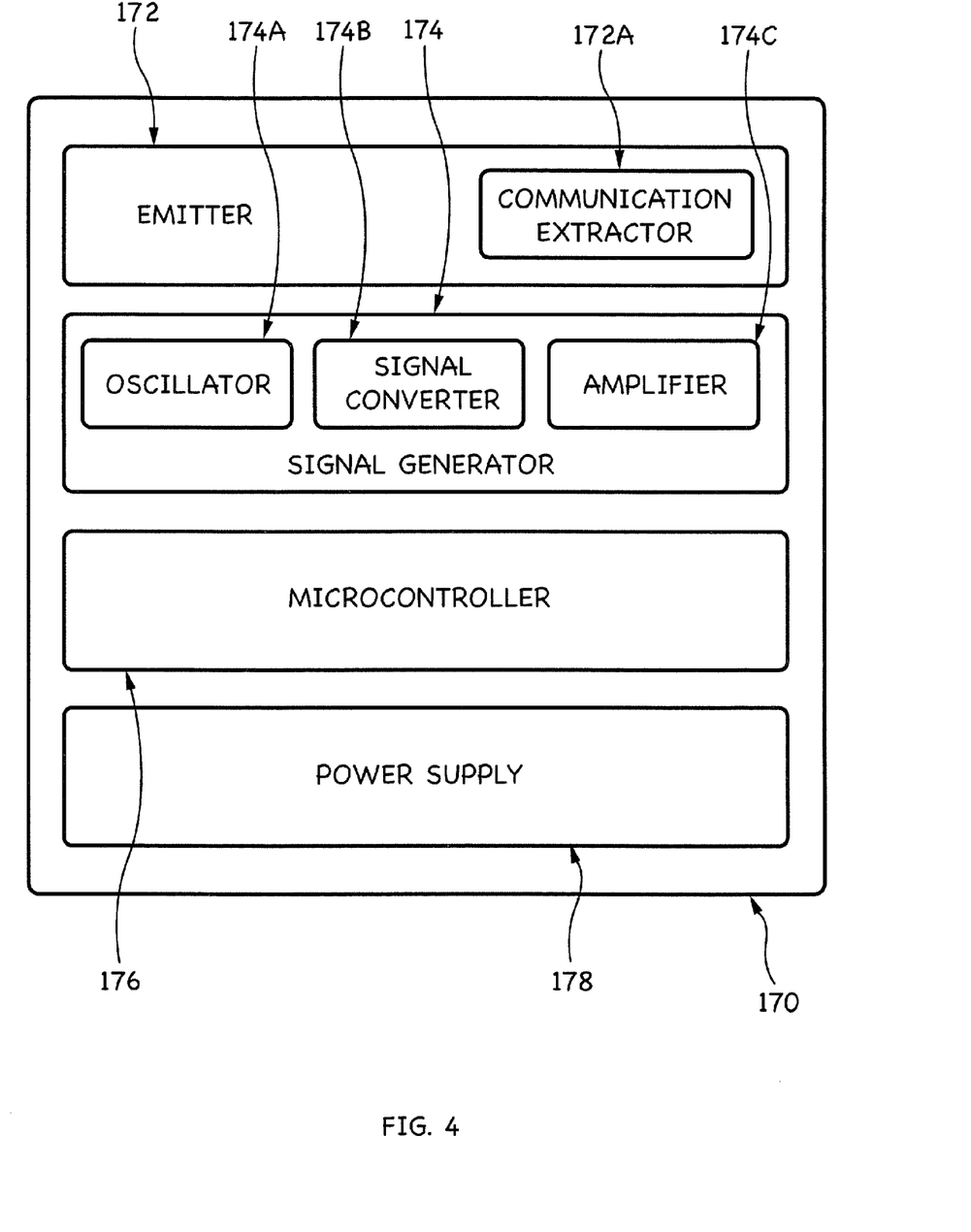
FIG. 4 is a schematic view of an acoustic signal source according to embodiments of the present invention.
Figure 5:
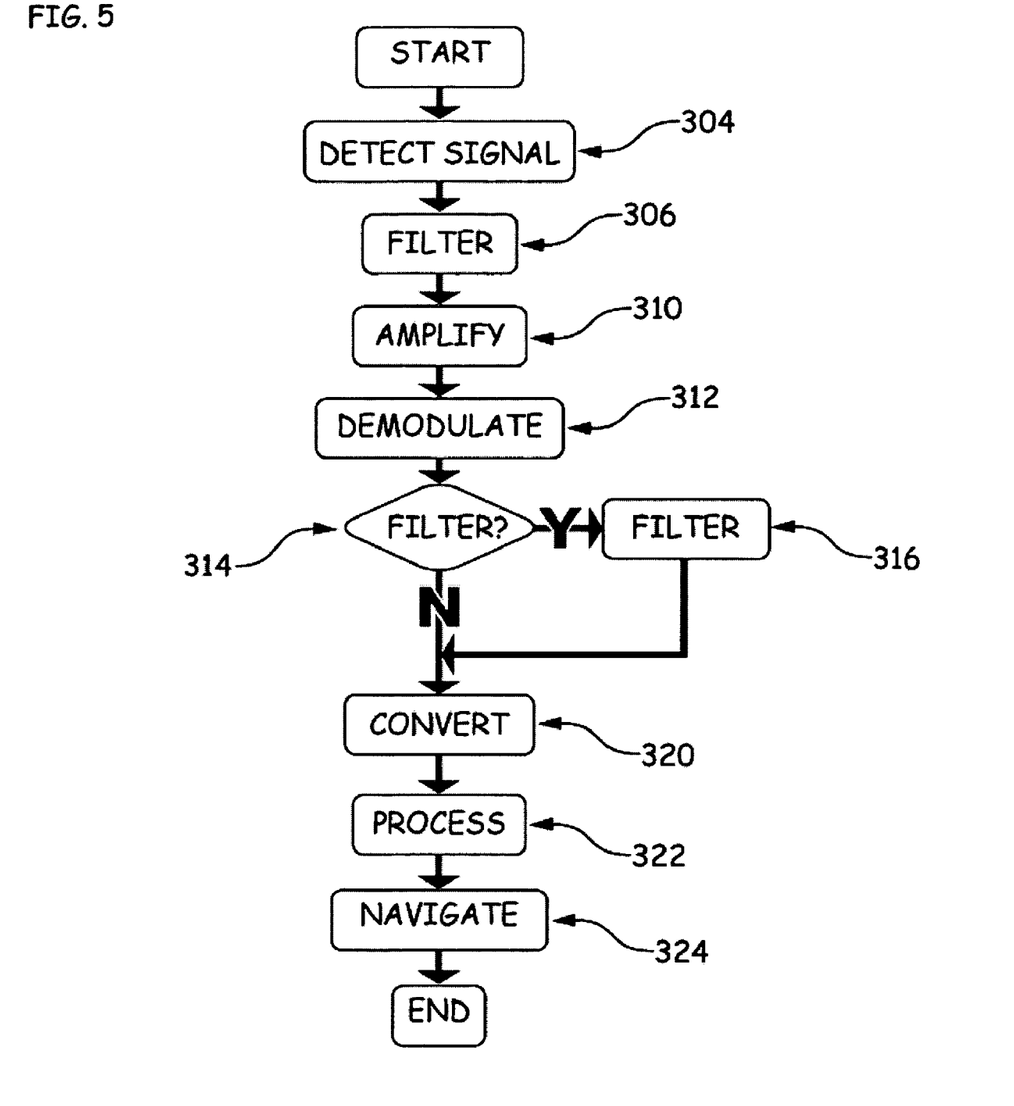
FIG. 5 is a flowchart illustrating methods according to embodiments of the present invention.

With reference to FIG. 4, an exemplary configuration of the acoustic signal source device 170 according to embodiments of the present invention is shown therein. The source 170 includes an emitter 172, a signal generator 174, a microcontroller 176, and a power supply 178. In some embodiments, the emitter 172 includes a piezoelectric element. However, other types of transducers may be used. In some embodiments, the signal generator 174 includes an oscillator 174A, a signal converter 174B, and an amplifier 174C. The oscillator 174A may be controllable or programmable. In some cases, the oscillator 174A is a temperature compensated oscillator. The microcontroller 176 can be any suitable circuit device that can control operation of the source 170. One example is a digital circuit that can process a control algorithm. The power supply 178 can be a battery or fuel cell, although other types of power supplies may be used. In some embodiments, the emitter 172 further includes a communication extractor 172A that can extract a communications signal component from a signal received by the emitter 172. For example, the communication extractor 172A may be a sideband extracting filter that can extract a sideband of a tonal, or an interval timer that can determine a pulse width data signal from the detected signal. In some cases, the extractor includes a modulator that adds information to an emitted signal (e.g., for outbound communications).

FIG. 4 is a flowchart illustrating methods of use of an ADGC system or ADGC system controlled vehicle and for mapping and/or navigating underwater in accordance with some embodiments of the present invention. Acoustic signals from an acoustic signal source are detected by the ADGC system (Step 304). The received or detected signals are filtered (Step 306), amplified (Step 310), and demodulated (Step 312). A determination is made as to whether an optional secondary filtering of the detected signal is needed or wanted (Step 314) and, if so, the secondary filtering is executed (Step 316). The signal is converted from an analog signal to digital form (Step 320). The digital signal is processed (Step 322). The processed signal or derived data is then used to navigate by determining at least one of location, source direction, and navigation update with respect to the acoustic signal source (Step 324). The navigating step may include issuing a control command to a navigation component or providing navigational information to a user, (e.g., via an electronic or visual interface). According to some embodiments, the navigation step includes moving through the water using ADGC system created information. According to some embodiments, the navigating step (Step 324) includes at least one of source detecting, tacking, direction finding, transiting, homing, triangulating, locating, range estimating, mapping, leading, following, and data communicating. Various of the foregoing steps may be modified or omitted in accordance with other embodiments of the invention.

The processing of the digital signal (Step 322) may include algorithm conducting, digital filtering, coherent combining, comparing, and/or convolving. Filtering detected signals may be conducted with a tracking filter, which may be any suitable filter that can maintain center frequency in relationship to the tonal frequency. In some cases, the sideband filtering step is practiced on the demodulated signal to provide a sideband removed demodulated signal. In some cases, the method includes analog combining of sensing element signals (e.g., signals from the multiple sensors 234 (FIG. 3) or an array of elements within a single sensor). This combining may be conducted prior to demodulating or filtering of the detected signals. In some cases, the combining is conducted using digital signals in the processing step.

According to some embodiments, demodulating (Step 312) is accomplished by quadrature demodulation using a temperature compensated oscillator to provide a reference signal. However, temperature compensation is not required and demodulation can be conducted otherwise. In some cases, a Doppler shift measure is band pass filtered to remove sidebands reflective of trajectory disturbance. In some cases, processing of digital signals includes Weiner filtering based on output of a disturbance sensor such as an accelerometer or inertial navigation unit to remove signal components reflective of trajectory disturbance.

According to some embodiments, the processing step (Step 322) includes combining Doppler shift measures (e.g., by subtraction to provide a differential Doppler shift, e.g., to remote surge or current effects). In some cases, the processing includes processing a plurality of Doppler shift measures reflecting a plurality of headings to determine, such as by interpolation, a Doppler direction. In some cases, heading or Doppler direction is determined with reference to compass direction or one or more GPS readings.

According to some embodiments, the method includes communicating between the ADGC system and another device such as an acoustic signal source and/or another a remote receiver. Such communicating may include detecting a command or other data, which can include frequency, amplitude or temporal modulation of a tonal or other signal detected by the ADGC system or other sensor. In some cases, communicating includes sending a signal (e.g., to a source or a sensor). For example, the ADGC system can issue a command to an acoustic signal source to commence or cease emitting a signal. The ADGC system can issue a mission update to a remote user (e.g., confirming arrival at a source). According to some embodiments, the ADGC system is an acoustic communications device configured to send and sends communications signals to such other devices (e.g., an acoustic signal source or a remove user) as an acoustic communications signal. According to some embodiments, the acoustic signal source communicates to the ADGC system. For example, the signal source may provide an identifier code or a signal comprising a characteristic tonal frequency permitting the ADGC system to distinguish among a plurality of sources. According to some embodiments, the acoustic signal source communicates to the ADGC system by sending the ADGC system an acoustic communications signal. According to some embodiments, the received signal can be processed by spread spectrum methods to remove multipath effects.

According to some embodiments, the ADGC system is used to estimate range to a source, or the rate of change in direction or bearing to the source (which may be referred to as "bearing rate"). One example of range estimation that may be employed is triangulation by calculating the intersection of Doppler directions determined by the vehicle as the vehicle transits. In some embodiments, bearing rate is determined as the time rate of change in Doppler direction using a clock signal.

According to some embodiments, the inventive acoustic signal source is used for at least one step of: deploying, station keeping, sleep mode operating, command detecting, operation commencing, signal emitting, temperature compensating, operation changing, emission ceasing, emission resuming, and communicating.

According to some methods in accordance with the present invention, the source is placed at a desirable marker location, detects a command or interrogation, emits a tonal signal, optionally controls the frequency of the oscillator to provide a fixed or adjusted tonal frequency, provides identifiable characteristics in the signal, and ceases emitting on command, after a predetermined time or when power of the interrogation falls below a threshold. In other methods, one or more marker is placed at an arbitrary location, which location is then mapped with respect to other locations to make its location secondarily desirable.

According to some embodiments, the source is movable and is tangibly associated with a moveable object that is desirably tracked or followed by the source so that an ADGC system can be used to track or follow the moveable object by determining a Doppler direction for the moveable source from time to time. The moveable source may be tangibly associated with the moveable object by mounting or carrying the source. For example, a source can be attached to a diver or vehicle so one or more vehicles or persons can navigate with respect to the vehicle- or diver-carried source.

According to some embodiments, a plurality of sources are placed at a plurality of respective locations to provide a navigation grid to aid navigation. In some cases, the sources are placed at desirable geo-locations. In some cases, the sources are placed at irregular or other locations. In some cases, the ADGC system is used to determine Doppler directions to the plurality of placed sources and, thereby, source positions with respect to the ADGC system. In some cases, source geo-location data is used to determine geo-location of the vehicle having the ADGC system. In some cases, navigation includes crossing lines between sources (vs. homing to one or more sources). According to some embodiments, the vehicle transits along a desired path through a field of placed sources and/or sources of opportunity.

According to some embodiments, the source is used to navigate by homing to a source and/or establishing a communication link. For example, an underwater vehicle including an ADGC system can be released from a communications uplink system to detect and navigate with respect to a tonal emitted by a source associated with a submerged sensing system (e.g., an antisubmarine warfare array). In some cases, the vehicle tows a connecting cable to the monitoring system and provides a connection (e.g., by fiber optic connector, light or electromagnetic signal means), which signal is conducted to the uplink system over the connecting cable.

According to some embodiments, the ADGC system is used to monitor or surveil by detecting or tracking a moving source of interest. In one example, an ADGC system is deployed statically to detect signals of interest and monitor its Doppler shift with respect thereto. The time when the Doppler shift reverses sign may be used to indicate time of closest approach. The time of closest approach may be communicated. In some cases, other information (e.g., tonal frequencies, frequency spectra, and/or derived parameters such as bearing rate, speed, range and estimated track) are also communicated. A plurality of devices may be used with their outputs being combined to provide an estimate of location and track of a desirably tracked target.

According to some embodiments, the source in use conserves energy by operating in sleep mode until a command or interrogation is detected.

The source may emit a tonal that is constant or dynamic. A dynamic type tonal may include information embodied by patterned interruption, amplitude modulation, or frequency modulation. In some cases, such information provides a source ID, command or mission data.

According to some embodiments, the Doppler direction finding is accomplished using various sequences of steps including at least one step of: detecting, combining, analog filtering, amplifying, demodulating, digitizing, digital filtering, processing, storing, comparing, combining, triangulating, and signal intensity measuring. In some cases, filtering involves at least one of: coherent filtering, low pass filtering, band pass filtering, high pass filtering, tracking filtering, Weiner filtering, and phase modifying.

The Doppler direction finding can be conducted by any suitable method that can establish bearing to a source based on changes in a Doppler shift frequency as a function of direction finder movement. In practice, Doppler direction can be found by an ADGC system-equipped vehicle transiting in a plurality of directions and interpolating a direction providing maximum Doppler shift. For this, the vehicle can adopt a tacking course like a sail boat navigating into the wind. According to some embodiments, the Doppler direction is determined to a target or source of opportunity which may be any suitable object or location emitting a detectable underwater acoustic signal (e.g., from a waterside power plant, manufacturing plant, or vessel or other platform). According to some embodiments, the Doppler direction is determined to a prescribed source device such as a dedicated source device or source device pre-associated with the ADGC system (e.g., the source 170).

According to some embodiments, the ADGC system determines for an acoustic signal from a passing source of interest at least one of: a Doppler shift measure; a bearing rate, and a time of closest approach to the ADGC system.

According to some embodiments, the ADGC system navigates the vehicle (e.g., the vehicle 120) proximate an acoustic signal source and then activates or deploys a payload proximate the source. According to some embodiments, the payload includes a mine neutralizing device such as an explosive or triggering device.

According to some embodiments, the ADGC system finds a Doppler shift measure one or more times during transit on a tack, or in a direction, and compares Doppler shift measures among tacks or directions to determine a Doppler direction. The ADGC system can then output a control signal serving as a navigational update to the vehicle or user. Doppler direction finding can be conducted from time to time to determine updated Doppler direction and, as needed, to provide navigational control update. In some embodiments, the Doppler direction finding includes detecting a sign reversal of the Doppler shift indicating closest point of approach to the source on the current movement direction. In certain embodiments, control output can include commands with regard to at least one of: speed, direction, turning, track reversing, searching, slowing, accelerating, stopping, and resuming.

In some embodiments, detecting a tonal is conducted using an ADGC system as described herein although other suitable Doppler direction finding devices may be used. In certain embodiments, source identifying includes comparing detected tonal frequency or other parameters to values stored in memory. In some embodiments, determining Doppler direction further includes determining heading adjustment to compensate for disturbance of the vehicle (e.g., current induced track error). For example, heading can be adjusted to orient the vehicle at least partly into the water current so thrust can counteract water current induced lateral displacement.

A vehicle as described herein can be deployed at a dispatch location that is determined by operational constraints such as water currents, vehicle capabilities, bathymetry, obstacles, and detection risk. For example, the vehicle can be deployed five miles up current to conserve power while homing just subsurface of the water to avoid bottom obstacles until reaching the vicinity of the target, then navigating down through the water during final closing with the marker or acoustic signal source.

While the description of embodiments of the invention discussed herein in terms of acoustic signals propagating in water, other signals and propagation media may also be employed in accordance with further embodiments of the invention.

The navigation controller 148 may include any suitable circuit, actuator or device operative to control the operation of the steering mechanism 124. According to some embodiments, the navigation controller 148 is operative to selectively control operation of the propulsor 122.

The detection and processing of the acoustic signals as disclosed herein in accordance with embodiments of the invention can be conducted in the time domain, the frequency domain, or a combination thereof, and can be conducted using analog components, digital components or a combination thereof.

According to some embodiments, the acoustic signal from the source includes a tonal including information characterized by at least one of: center frequency, bandwidth, frequency modulation, amplitude, amplitude modulation, interruption pattern, duty cycle, and duration.

Embodiments of the invention are described herein in terms of a characteristic or identifying frequency component (hereinafter referred to as a "tonal"). One example of a tonal is a signal centered at 11,100 Hz and having a frequency width between 0.001 Hz and 1000 Hz. In some embodiments, a signal can have more than one tonal, for example a spread spectrum of tonals. In some cases, the monitored, measured or processed characteristic includes at least one of: band width, sideband structure, frequency modulation, amplitude, amplitude modulation, interruption pattern, duty cycle, duration, and source location.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An unmanned underwater vehicle for use in water and with at least one acoustic signal source, the vehicle comprising:
   a vehicle body;
   a steering mechanism to direct the vehicle body through the water;
   a propulsion device to force the vehicle body through the water; and an adaptive Doppler guidance and control (ADGC) system configured to receive acoustic signals from the at least one acoustic signal source and to control the steering mechanism using changes in at least one frequency component of the received acoustic signals caused by Doppler shifts;

wherein the ADGC system includes a guidance sensor to sense a parameter of the unmanned underwater vehicle.

2. The unmanned underwater vehicle of claim 1 wherein the ADGC system is configured to compensate for at least one of: physical perturbations to the unmanned underwater vehicle; and multi-path signals.

3. The unmanned underwater vehicle of claim 1 wherein the ADGC system includes a digital sampler and a digital processor, wherein the digital sampler is configured to convert at least one of an acoustic sensor signal and a guidance sensor signal to a digital signal, and wherein the digital processor is configured to process the digital signal according to an algorithm to compute a guidance update and to communicate the guidance update to at least one of the steering mechanism and the propulsion device.

4. The unmanned underwater vehicle of claim 1 including a payload.

5. An underwater guidance system for use in water, the underwater guidance system comprising:

at least one acoustic signal source including an emitter wherein the emitter emits acoustic signals; and an adaptive Doppler guidance and control (ADGC) system at a location spaced apart from the acoustic signal source, wherein the ADGC is configured to receive the acoustic signals from the at least one acoustic signal source and to generate navigation signals and/or mapping signals based on changes in at least one frequency component of the received acoustic signals caused by Doppler shifts.

6. The underwater guidance system of claim 5 wherein the at least one acoustic signal source includes a prescribed source device.

7. The underwater guidance system of claim 5 wherein the at least one acoustic signal source includes a source of opportunity.

8. The underwater guidance system of claim 5 wherein the at least one acoustic signal source includes a plurality of spatially separated acoustic signal sources and the ADGC system is operative to interpolate therebetween.

9. The underwater guidance system of claim 5 wherein the ADGC system is configured to send and/or receive acoustic communications signals.

10. A system for use in water, the system comprising:

at least one acoustic signal source including an emitter, wherein the emitter emits acoustic signals; and an unmanned underwater vehicle at a location spaced apart from the acoustic signal source, the unmanned underwater vehicle including:

a vehicle body;

a steering mechanism to direct the vehicle body through the water;

a propulsion device to force the vehicle body through the water; and an adaptive Doppler guidance and control (ADGC) system configured to receive the acoustic signals from the at least one acoustic signal source and to control the steering mechanism using changes in at least one frequency component of the received acoustic signals caused by Doppler shifts.

11. A method for navigating and/or mapping underwater, the method comprising:

receiving acoustic signals from at least one acoustic signal source;

processing the received acoustic signals; and generating navigation signals and/or mapping signals based on changes in at least one frequency component of the received acoustic signals caused by Doppler shifts, and determining a location and/or an orientation of the underwater vehicle;

wherein the step of generating navigation signals and/or mapping signals includes generating navigation signals, the method further including controlling a direction of propulsion of an underwater vehicle using the navigation signals.

12. The method of claim 11 wherein the navigation signals are adapted to maintain an intended direction of movement of the underwater vehicle that results in a desired Doppler shift of the at least one frequency component of the received acoustic signals.

13. The method of claim 11 including sensing a parameter of the underwater vehicle.

14. The method of claim 11 including compensating for at least one of: physical perturbations to the underwater vehicle; and multi-path signals.

15. The method of claim 14 further including removing undesirable components from the received acoustic signals including components at undesired frequencies and components that are incoherent with respect to the at least one frequency component.

16. The method of claim 11 including determining, with respect to at least one of a steering mechanism of the underwater vehicle and a propulsion mechanism of the underwater vehicle, at least one of position, orientation, force, torque, and angular velocity.

17. The method of claim 11 wherein the step of processing the received acoustic signals includes demodulating the at least one frequency component of the received acoustic signals to determine frequency modulations and/or amplitude modulations of the at least one frequency component of the received signals.

18. The method of claim 11 wherein the at least one frequency component of the received acoustic signals includes a plurality of frequency components, and processing the received acoustic signals includes determining the Doppler shift for the plurality of frequency components of the received acoustic signals.

19. An unmanned underwater vehicle for use in water and with at least one acoustic signal source, the vehicle comprising:

a vehicle body;

a steering mechanism to direct the vehicle body through the water;

a propulsion device to force the vehicle body through the water; and an adaptive guidance and control system configured to receive acoustic signals from the at least one acoustic signal source and to control the steering mechanism using changes in at least one frequency component of the received acoustic signals, wherein the adaptive guidance and control system is configured to compensate for physical perturbations to the unmanned underwater vehicle.

20. An underwater guidance system for use in water and with at least one acoustic signal source, the underwater guidance system comprising:

an adaptive Doppler guidance and control (ADGC) system configured to receive acoustic signals from the at least one acoustic signal source and to generate navigation signals and/or mapping signals based on changes in at least one frequency component of the received acoustic signals caused by Doppler shifts;

wherein the at least one acoustic signal source includes a plurality of spatially separated acoustic signal sources and the ADGC system is operative to interpolate therebetween.

21. An underwater guidance system for use in water and with at least one acoustic signal source, the underwater guidance system comprising:

an adaptive Doppler guidance and control (ADGC) system configured to receive acoustic signals from the at least one acoustic signal source and to generate navigation signals and/or mapping signals based on changes in at least one frequency component of the received acoustic signals caused by Doppler shifts;

wherein the ADGC system is configured to send and/or receive acoustic communications signals.

22. A method for navigating and/or mapping underwater, the method comprising:

receiving acoustic signals from at least one acoustic signal source;

processing the received acoustic signals;

generating navigation signals and/or mapping signals based on changes in at least one frequency component of the received acoustic signals caused by Doppler shifts; and sensing a parameter of the underwater vehicle;

wherein the step of generating navigation signals and/or mapping signals includes generating navigation signals, the method further including controlling a direction of propulsion of an underwater vehicle using the navigation signals.

23. A method for navigating and/or mapping underwater, the method comprising:

receiving acoustic signals from at least one acoustic signal source;

processing the received acoustic signals;

generating navigation signals and/or mapping signals based on changes in at least one frequency component of the received acoustic signals caused by Doppler shifts; and determining, with respect to at least one of a steering mechanism of the underwater vehicle and a propulsion mechanism of the underwater vehicle, at least one of position, orientation, force, torque, and angular velocity;

wherein the step of generating navigation signals and/or mapping signals includes generating navigation signals, the method further including controlling a direction of propulsion of an underwater vehicle using the navigation signals.

24. An underwater guidance system for use in water and with at least one acoustic signal source, the underwater guidance system comprising:

an adaptive Doppler guidance and control (ADGC) system configured to receive acoustic signals from the at least one acoustic signal source and to generate mapping signals based on changes in at least one frequency component of the received acoustic signals caused by Doppler shifts.

* * * * *

UNITED STATES PATENT AND TRADEMARK OFFICE
CERTIFICATE OF CORRECTION

| | | |
|---|---|---|
| PATENT NO. | : 7,495,999 B2 | Page 1 of 1 |
| APPLICATION NO. | : 11/495134 | |
| DATED | : February 24, 2009 | |
| INVENTOR(S) | : Kemp et al. | |

It is certified that error appears in the above-identified patent and that said Letters Patent is hereby corrected as shown below:

In the Claims:

Column 15, Claim 5, Line 25: Please correct "including-an emitter"
to read -- including an emitter, --

Column 16, Claim 11, Line 3: Please correct "shifts," to read -- shifts; --

Signed and Sealed this
Twenty-first Day of August, 2012

David J. Kappos
*Director of the United States Patent and Trademark Office*